UNITED STATES PATENT OFFICE.

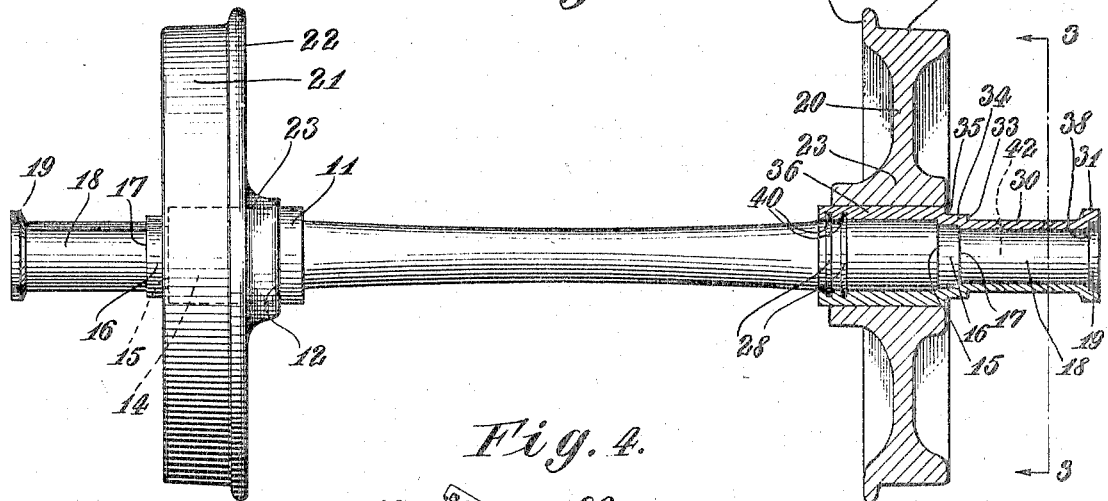
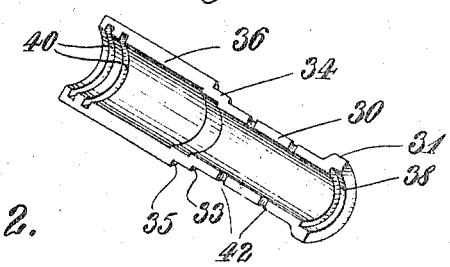
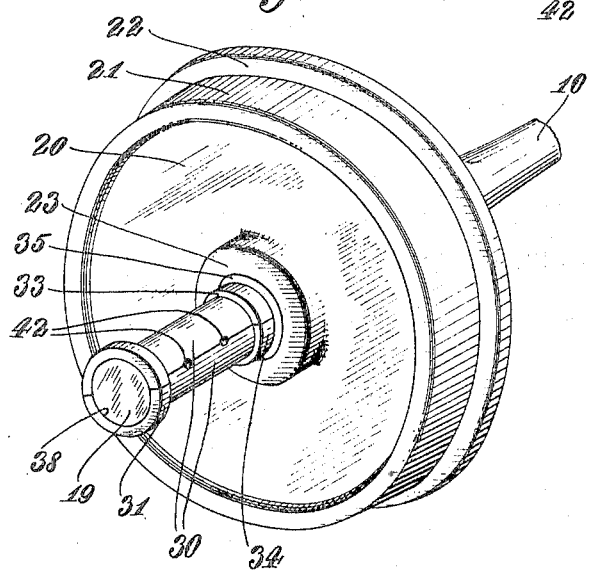
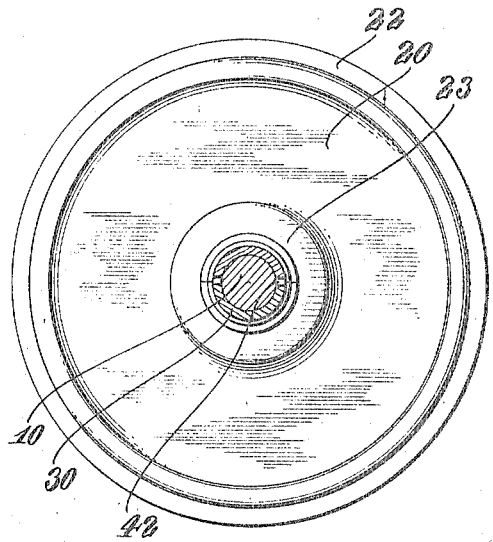

ARTHUR W. DOWE, OF SAN FRANCISCO, CALIFORNIA.

DIFFERENTIAL CAR WHEEL AND AXLE.

1,316,087.  Specification of Letters Patent.  Patented Sept. 16, 1919.

Application filed August 21, 1918. Serial No. 250,792.

*To all whom it may concern:*

Be it known that I, ARTHUR W. DOWE, a citizen of the United States, and a resident of San Francisco, in the county of San Francisco and State of California, have invented certain new and useful Improvements in Differential Car Wheels and Axles, of which the following is a specification.

This invention relates broadly to improvements in vehicle axles, and particularly to axles having a wheel near each end, as used upon railway cars.

The principal object is to produce an axle having one wheel rigidly affixed and the other wheel rotatably mounted, so that when the car is passing over curves, one of the wheels may rotate at a different velocity relative to the other, thus obviating unnecessary grinding, wear and noises of the rails and wheels, caused by slipping, due to the difference in radii of the track rails.

Another object is to produce means whereby the rotatable wheel is prevented from moving longitudinally of the axle.

Still another object is to produce means which co-act between the wheel and axle without weakening either, or entailing even the slightest change in the parts engaged with the axle, and which can be applied to worn axles, practically renewing their usefulness.

These and other analogous objects, such as the provision of adequate means for lubricating parts which have relative movement, and the entire absence of keys, splines, springs, bolts, nuts, screws and the like, are attained by the novel construction and combination of parts hereinafter described and shown in the accompanying drawing, forming a material part of this disclosure, and in which:—

Figure 1 is a front elevational view of a conventional type of car axle and its wheels, one being rigidly engaged and the other, shown in vertical section, as secured by the device to the axle.

Fig. 2 is a perspective view looking at the end of the axle.

Fig. 3 is a transverse sectional view of the same, the section being taken on line 3—3 of Fig. 1, and Fig. 4 is a perspective view showing one of the split sleeves used as connecting elements.

The axle here shown has its central portion 10, slightly reduced in diameter from the ends 11, provided with shoulders 12, from which extend cylindrical seats 14, having shoulders 15, and stepped seats 16 for the dust guard, presenting another shoulder 17, and extending therefrom are the cylindrical journals 18, terminating in enlarged integral collars 19, these journals being rotatably mounted in bearings (not shown) forming part of the car truck.

The wheels 20 are formed with treads 21, having guide flanges 22, making contact with the inner side of the rail head, the hubs 23 being bored to suit the axle seats 14, which are forced in under sufficient pressure to form a substantially unitary structure; the foregoing is descriptive of common axle and wheel construction and may be used in the present embodiment at one end of the axle.

At the other end of the axle the same general conditions exist, except the shoulders 15 and 17 are cut farther back and the seat 14, together with the step 16 and journal 18 are slightly reduced in diameter, while in place of the shoulder 12 are formed one or more raised annular collars or rings 28.

Fitted to freely rotate on the reduced end of the axle, is an adapter or sleeve comprised of two equal semi-cylindrical stepped elements, forming an outer tubular member 30, adapted to rotate upon the journal 18, and having an enlarged end 31, recessed in its interior for the collar 19.

A shoulder 33 leads to the step 34 and another shoulder 35 leads to the wheel seat 36.

It is to be understood that the several diameters or steps of the sleeve and the respective lengths, are substantially similar and uniform with the solid, opposite end of the axle, upon which it is engaged so, that the usual fitting are connected without change.

The sleeve itself however, is revoluble on the reduced end of the axle and held from longitudinal movement partially by the collar 19 which fits the corresponding recess 38 at the outer end of the axle, while at the larger opposite end of the sleeve, within the bore, are concentric annular grooves 40, receptive of the raised rings 28 formed on the axle, the rings and grooves acting as dust guards, which, with the collar 19, prevent the entrance of grit, dust and the like and also serve to restrain lubricants entered between the sleeve and axle through the oil holes 42, which serve to convey lubricant from the brass boxes, which rest upon or surround the sleeve as usual.

When the sleeve sides have been fitted to the axle and placed in the position they are to occupy thereon, the wheel hub is forced upon the seat 36, in the same manner as if it was solid, securely clamping the two parts of the sleeve together, but permitting it to rotate upon the axle.

These sleeves may be applied to axles which have become worn and obviously permit of the re-boring of wheels, as well.

Thus the sleeve is at once used as a bearing and as a journal; the principal feature is however, that this arrangement does not interfere with trucks of standard, present type construction, permitting the usual dust guard to be used and also allows both the sleeve and axle to terminate together in the oil box; thus the means used for lubricating the journal, carrying an axle with a rigid wheel, now provides for lubricating the differential.

It is to be noted that no loose parts, oilers, bolts, nuts, springs, keys or the like are required, and that the sleeves can be easily constructed and applied, while the axle ends are readily reduced.

Having thus described my invention and set forth the manner of its construction, application and use, what I claim as new and desire to secure by Letters Patent, is:—

1. In a device of the class described the combination with a stepped axle having enlarged ends and wheels having elongated hubs, of split sleeves circumjacent to said hub, said sleeves extending from the ends of said axle past said hubs and having portions circumjacent to the ends of said axle acting as journals to carry the load, and means for lubricating the surfaces between said sleeves and axle ends, the hub of said wheel clamping said split sleeve in position on said axle.

2. In a device of the class described, the combination with a stepped axle having an enlarged end, of a split sleeve circumjacently rotatable thereon, said sleeve encompassing the entire end of said axle, forming journals, and extending longitudinally inward beyond the wheel seat thereof, interengaging means integrally formed between said axle and said sleeve for preventing relative longitudinal movement, said means acting as a dust guard, and means for clamping said split sleeve on said axle.

3. In a device of the class described, the combination with a stepped axle, of a split sleeve fitted to revolve thereon, means for entering lubricant to the adjacent surfaces, means integrally formed with said axle and sleeve coöperating within the interior of said sleeve to prevent relative longitudinal movement, and means for clamping said sleeve to said axle whereby a portion of said sleeve is exposed, said exposed portion extending to the extreme outer end of said axle and forming a journal.

4. In a device of the class described, the combination with a wheel, an axle having a cylindrical wheel-seat surface thereon and a raised integral annulus at its end, of a journal bearing sleeve revoluble on said wheel-seat surface, said sleeve being rigidly engaged in said wheel, and means combined with said sleeve at each end thereof for preventing longitudinal action of the sleeve on said axle, said means being wholly contained within the length of said sleeve which extends outward from said wheel seat surface to the extremity of said axle.

5. In a device of the class described, the combination with a wheel and an axle having a wheel-seat surface, of a plain cylindrical bearing sleeve revoluble on said wheel-seat surface, rigid in said wheel, said sleeve extending to the outer extremity of said axle, and forming a journal to carry the load, and rings formed integrally with said axle at each end of said sleeve for retaining said bearing sleeve on said wheel seat surface, said rings being wholly interior of said sleeve.

6. In a device of the class described, the combination with an axle having two straight cylindrical end portions of different diameters, the lesser being the outermost, of a sleeve circumjacent to both of said cylindrical portions and revoluble thereon, said sleeve having two straight cylindrical portions, the outer smaller portion being adapted to act as a journal and the larger inner portion as a wheel seat, annular recesses formed interiorly of said sleeve, raised rings integrally formed with said axle engaging in said recesses, and a wheel having its hub bored and adapted to be forced upon said wheel seat.

7. In a device of the class described, a differential wheel mount comprising in combination an axle having stepped ends, the steps at one end being larger than the corresponding steps at the other, a wheel rigidly engaged on one of the steps at the larger end, a rotatable stepped sleeve encircling all of the steps at the smaller end, a wheel rigidly engaged on the step of said sleeve corresponding to the step on said axle on which the first named wheel is secured, and means integrally formed with said axle and said sleeve preventing relative longitudinal motion.

8. In a device of the class described, the combination with a car axle having a wheel rigidly affixed at one end and a journal portion extending outwardly therefrom, of a reduced stepped portion at the opposite end of said axle, a split sleeve revolubly mounted on said stepped portion within the length thereof, means of introducing lubricants to the surfaces therebetween, annular rings on said axle, said rings fitting grooves formed in said sleeve, said sleeve having an outer journal portion and a seat portion, and a wheel forced on said seat portion, said wheel clamping said split sleeve to said axle.

9. In combination, an axle composed of one piece of metal having a journal at one end formed in the usual manner, a car wheel, and a split bushing held in place by an annular shoulder at the extremity of the mentioned end of the axle, said bushing having a bearing upon the axle extending from the inner edge of the wheel hub to the outer end of the axle, and a journal surface on the outer end of said bushing adapted to receive the bearing brass carrying the load, the parts of said bushing being held together by the hub of the wheel when pressed on over them.

In testimony whereof I have signed my name to this specification.

ARTHUR W. DOWE.